United States Patent
Shah et al.

(10) Patent No.: US 10,205,717 B1
(45) Date of Patent: Feb. 12, 2019

(54) VIRTUAL MACHINE LOGON FEDERATION

(71) Applicant: Amazon Technologies, Inc., Reno, NV (US)

(72) Inventors: Shon Kiran Shah, Redmond, WA (US); Ajit Nagendra Padukone, Bellevue, WA (US); Deepak Suryanarayanan, Seattle, WA (US); Erik Jonathon Tellvik, Renton, WA (US); David Everard Brown, Western Cape (ZA)

(73) Assignee: AMAZON TECHNOLOGIES, INC., Seattle, WA (US)

(*) Notice: Subject to any disclaimer, the term of this patent is extended or adjusted under 35 U.S.C. 154(b) by 0 days.

(21) Appl. No.: 13/854,697

(22) Filed: Apr. 1, 2013

(51) Int. Cl.
*H04L 9/32* (2006.01)
*H04L 29/06* (2006.01)
*G06F 21/00* (2013.01)

(52) U.S. Cl.
CPC .................. *H04L 63/0815* (2013.01)

(58) Field of Classification Search
CPC . H04L 63/08; H04L 63/0807; H04L 63/0813; H04L 63/0815; H04L 63/0823; H04L 63/0884; G06F 21/31; G06F 21/33; G06F 21/41; G06F 21/53

USPC ..... 726/3–4, 6–9, 26–29; 713/154–157, 168, 713/170, 176
See application file for complete search history.

(56) References Cited

U.S. PATENT DOCUMENTS

| | | | |
|---|---|---|---|
| 2011/0099616 A1 | 4/2011 | Mazur et al. | |
| 2011/0314533 A1* | 12/2011 | Austin et al. | 726/9 |
| 2012/0117634 A1* | 5/2012 | Halls et al. | 726/7 |
| 2012/0254957 A1* | 10/2012 | Fork et al. | 726/6 |
| 2013/0254847 A1* | 9/2013 | Adams | G06F 21/6218 726/4 |
| 2014/0013409 A1* | 1/2014 | Halageri | 726/8 |

* cited by examiner

*Primary Examiner* — Noura Zoubair
(74) *Attorney, Agent, or Firm* — Davis Wright Tremaine LLP

(57) ABSTRACT

Systems and methods are described for providing federated access to end-users of virtual machines. The method includes receiving a request from a user to access a resource outside of the user's original security domain. The user's existing security credentials are forwarded to an authentication entity, which determines if the user's credentials are authentic. If it is determined that the user's credentials are authentic, the user's target identity provider generates a security token that provides the virtual machine user with access to the resource, the resource residing in an external security domain. The user may log on to the virtual machine with access to the desired resource, subject to the privileges identified in the security token.

22 Claims, 6 Drawing Sheets

VIRTUAL MACHINE LOGON FEDERATION

BACKGROUND

In recent years, an ever increasing number of applications and services have been made available over networks such as cellular networks and the Internet. Due to this, an increasing number of content and service providers are turning to technologies such as remote resource sharing and cloud computing. Cloud computing, in general, is an approach to providing access to electronic resources through services, such as Web services, where the hardware and/or software used to support those services is dynamically scalable to meet the needs of the services at any given time. A user or customer of a service provider will typically rent, lease, or otherwise pay for access to resources through the cloud, and thus does not have to purchase and maintain the hardware and/or software to provide access to these resources.

In this context, a large number of security concerns are faced by service providers and by their customers. Typically, the service provider wants to ensure that the resource infrastructure is secure and that their customers' services and data are protected. Similarly, the customer of the service provider needs to ensure that the provider has taken the proper security measures to protect their information against unauthorized use or access from end users or various other parties. These security concerns are also important considerations with respect to users of virtual machines that wish to access resources in security domains outside of their standard security domain. Further, when a virtual machine user operates in different security domains it is problematic for the user to have to create and maintain credentials for each security domain. It is thus desirable to provide an alternative log on operation to enable the virtual machine user to access resources outside of their original security domain in a trusted and secure manner.

BRIEF DESCRIPTION OF THE DRAWINGS

Various embodiments in accordance with the present disclosure will be described with reference to the drawings, in which.

DETAILED DESCRIPTION

Figure 1:
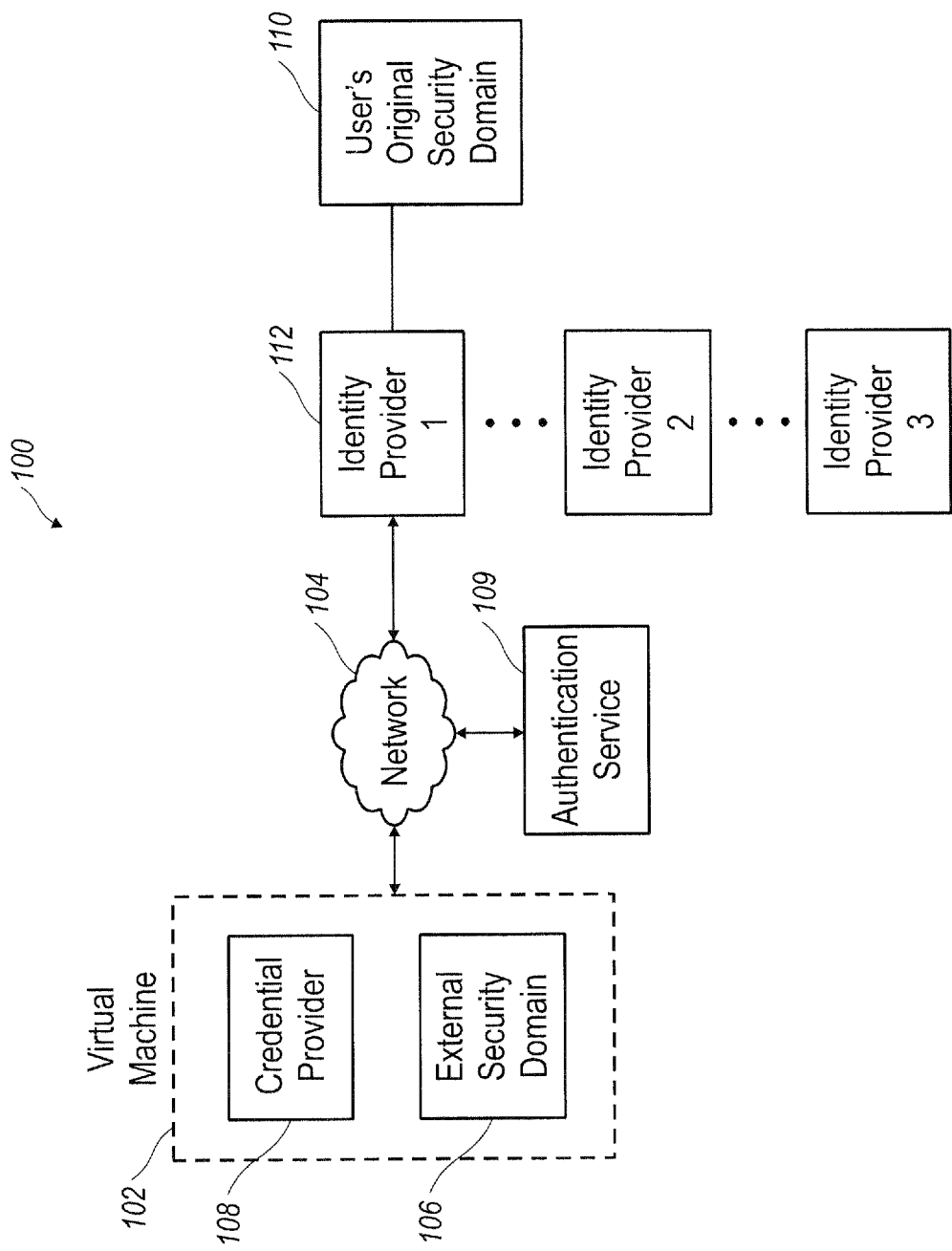
FIG. 1 illustrates an environment including a credential provider configured to facilitate virtual machine log on, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with embodiments described herein overcome the various deficiencies in existing approaches for providing log on capabilities to virtual machine users. In particular, the various embodiments provide virtual machine users with the capability of accessing resources that are outside of the user's original security domain.

In accordance with various embodiments, a credential provider in tandem with specific endpoints, such as Security Assertion Markup Language ("SAML") or Active Directory Federation Services ("ADFS") endpoints, can be used to support federated login to virtual machines in a new security domain using an end-user's credentials from an existing identity provider. The credential provider is an authentication system implemented as part of a virtual machine logon process, and can authenticate a user's credentials against a target identity provider. The credentials can be in various forms including text, smart card data, biometrics, as well as other forms, including combinations of these forms. Once authenticated against a target identity provider, these credentials can be used to authorize access to a resource outside of the user's security domain.

In accordance with various embodiments, the target identity provider for the credential provider can be an Active Directory ("AD") deployment, accessed via an SAML endpoint such as an ADFS endpoint. ADFS allows an application residing outside a user's security domain to authenticate the user against her credentials in her originating domain before authorizing access in an external domain. The authentication and authorization process involves sending the user's credentials to a server configured for ADFS. Once the credentials are authenticated, ADFS sends back a security token to the requesting application. The token issued contains information about the user and can be used to establish privileges for the user in the external domain.

In accordance with various embodiments, a computer-implemented method for logging on to a virtual machine is provided. Under control of one or more computer systems configured with executable instructions, the credential provider receives one or more user credentials from a user of the virtual machine. The one or more user credentials are obtained by the user from a security domain of the user. The credential provider receives, from the user, a request to access a resource outside the user's original security domain. The user credentials are forwarded to an authentication entity. If it is determined that the user's credentials are authentic, the identity provider forwards a security token to the credential provider, where the security token is for providing access to the resource outside of the user's original security domain. The user of the virtual machine is then provided with access to the desired resource outside the user's security domain as determined using information in the security token.

In accordance with various embodiments, a computer-implemented method is provided, where, under control of one or more computer systems configured with executable instructions, the method includes receiving one or more credentials from a user of the virtual machine, where the one or more credentials relates to the security domain of the user. It is then determined by a credential provider if the one or more user credentials are authentic. The method includes receiving identity information for the user, the identity information generated by an identity provider, and providing the user of the virtual machine with access to the resource, the resource residing in an external security domain, wherein the user may log on to the virtual machine via the identity information. The identity information may include a security token issued by the identity provider. The external security domain retains the user privileges between successive user login attempts to the virtual machine. Each user login attempt is authenticated in order to verify the user is still authorized within the external security domain.

FIG. 1 illustrates a high-level example of an environment 100 for implementing aspects in accordance with various embodiments. As will be appreciated, although a Web-based environment is used for purposes of explanation, different environments may be used, as appropriate, to implement various embodiments. A virtual machine 102 is a software implementation that can be run on any appropriate device operable to send and receive requests, messages, or information over an appropriate network 104 and convey information back to a user of the device. Examples of such devices include personal computers, cell phones, handheld messaging devices, laptop computers, set-top boxes, personal data assistants, electronic book readers, and the like. Network 104 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over network 104 can be enabled by wired or wireless connections, and combinations thereof.

A user of virtual machine 102 may wish to access an application that is in an external security domain 106, e.g., in a security domain that is outside of the user's original security domain 110. Credential provider 108 is an application that can reside on virtual machine 102 or may reside external to virtual machine 102 such as on a separate server. Credential provider 108 is used to authenticate the user's credentials within the original security domain 110 before allowing the user to access the desired application located within the external security domain 106. The user credentials can be of any different type of security credentials including but not limited to text entries such as passwords, smart cards, keys, the use of biometric technology, or the like. When a user wishes to log on to a virtual machine 102, the user is prompted to enter their security credentials. Credential provider 108 sends the user's existing security credentials to an authentication service 109 over network 104. Authentication service 109 determines if the user's credentials are authentic. Authentication service 109 is in communication with one or more identity providers 112 via network 104. Identity provider 112 can be an AD deployment accessed via an SAML end point such as ADFS. Once the user's credentials are authorized against the target identity provider 112, the user can be given authorization to access an application or resource within external security domain 106 on the virtual machine.

Figure 2:
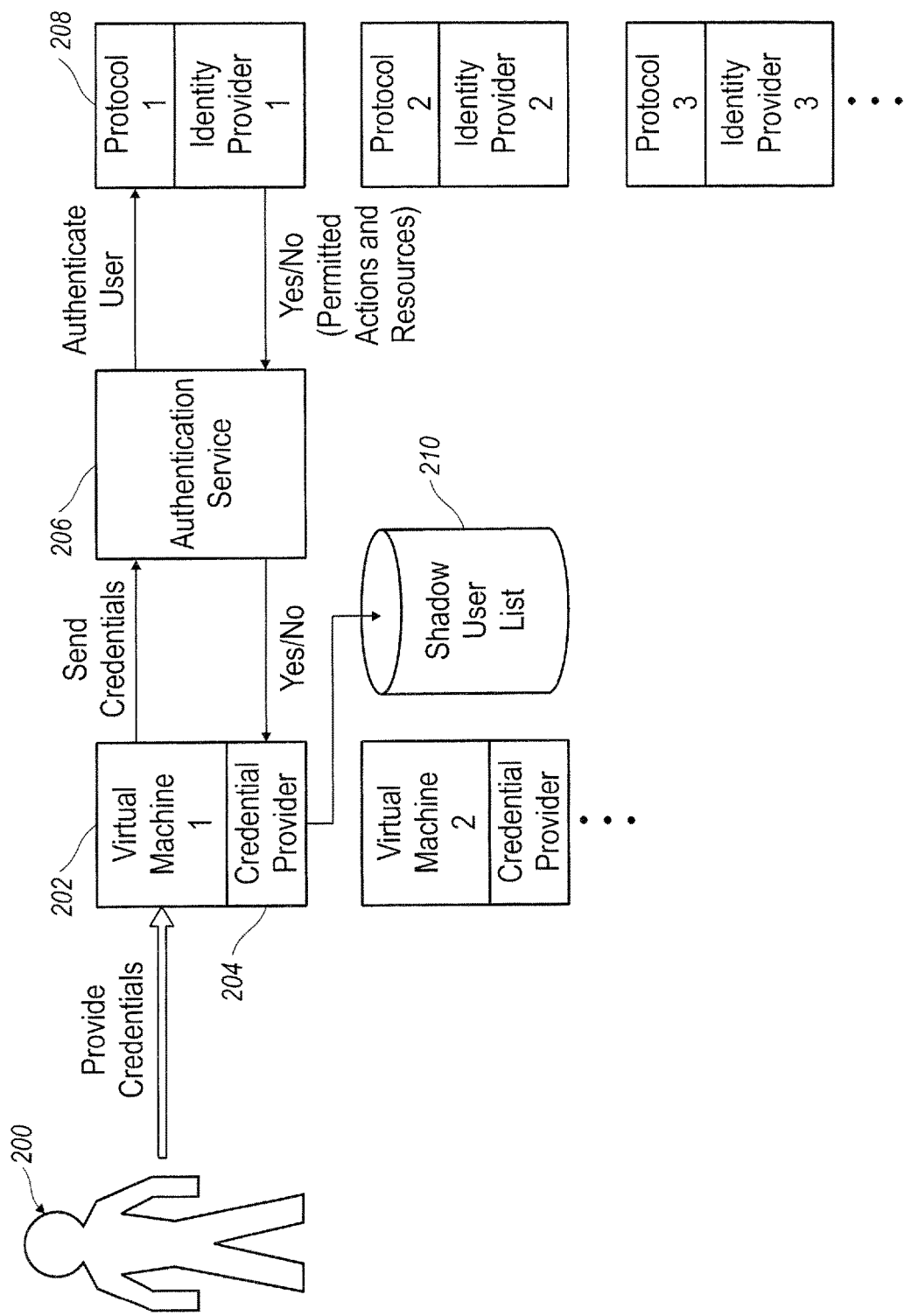
FIG. 2 illustrates a virtual machine log on process using the credential provider, in accordance with various embodiments.

FIG. 2 illustrates an example of providing authorization to a user of a virtual machine, in accordance with various embodiments.

As an illustration, user 200 logs on to a virtual machine 202 by providing the user's existing AD credentials, via credential provider 204. Credential provider 204 can be a combination of hardware and software components and can reside either on the virtual machine 202 or be external to the virtual machine 202. Credential provider 204 can include an authorization provider that passes the user's credentials to an authentication service 206. Authentication service 206 can determine if the user credentials provided by the credential provider 204 are authentic. If the user credentials are not authentic, the credential provider 204 is notified by the authentication service 206, and the user is denied access to the requested application. If the credentials are authentic, authentication service 206 transmits a request for a security token to the user's identity provider 208, accessed via an SAML/ADFS endpoint or proxy. Authentication service 206 can be configured to interface with any identity provider 208, including identity providers having different protocols. Identity provider 208 responds to the request by authentication service 206 with a security token. Information in the security token can be used to determine the user's privileges in the external security domain. The user's privileges may include group settings, and permitted or forbidden actions and resources. For example, the user privileges may designate specific actions that the user may be allowed or forbidden from taking while logged onto a specific application on virtual machine 202. These actions might include, for example, enabling one or more other users under the primary user's account.

Once the user's credentials have been authenticated, the security token is forwarded by authentication service 206 to virtual machine 202. In various embodiments, the credential provider 204 creates a shadow user list 210. Shadow user list 210 includes user names that have been granted access to resources in the external security domain that users 200 are seeking to obtain access to. In various embodiments, each shadow user 210 is identified by the same name that user 200 used to log onto virtual machine 202. The shadow user 210 is assigned an organizational unit (OU) based on the user's privileges in the external security domain. The security token allows the user 200 to log onto virtual machine 202 and access an application or resource outside of the user's original security domain. User 200 may now log onto an instance on virtual machine 202 in order to access resources outside of the user's original security domain. The log on process described herein provides a user 200 with an alternative procedure when logging on to a virtual machine 200. As described below, when logging onto a virtual machine and wishing to obtain access to an application or resource residing outside of the user's original security domain, user 200 is presented with an alternative log on procedure option that grants the user access to the desired resource. Advantageously, the process described herein allows a user of a virtual machine to operate in security domains outside of the user's original security domain without the need to create and maintain separate credentials for each external security domain.

Figure 3:
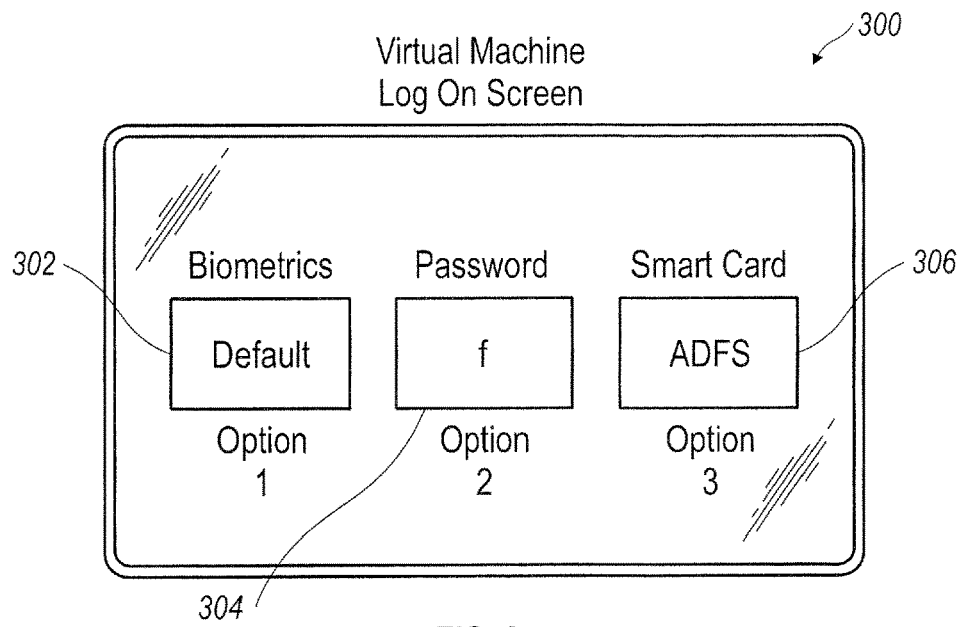
FIG. 3 illustrates a virtual machine log on screen, in accordance with various embodiments.

FIG. 3 illustrates an example of different types of user credentials available to the user of a virtual machine via the credential provider, in accordance with various embodiments.

The user can sign on to the virtual machine in a variety of different ways via the use of the credential provider. For example, in a non-limiting example, FIG. 3 illustrates three different ways that a user may provide their security credentials to the credential provider in order to initiate the authentication process illustrated in FIG. 2. Log on screen 300 may be presented to the user of a virtual machine who wants to access a resource or application in an external security domain. The user is prompted to provide their authentication credentials. These credentials will then be sent by the credential provider to an authentication service that will authorize the user to log onto the resource in the external security domain. One or more options may be presented to the user in order to log on to the virtual machine. The options shown in FIG. 3 are merely illustrative and it is understood that fewer, more, different or combinations of options may be available to the user. A first credential option 302 available to the user is via the use of one or more commonly known biometric authentication parameters. The user may also log onto the virtual machine by a second option 304 such as by supplying a text-based password, or a password to the user's existing social network account such as Facebook® or Twitter®. A third option 306 is via the use of a smart card or key. Combinations of different types of credentials may also be used and the invention is not limited in this regard. It should be noted that the log on procedure provided to the user as described herein may be presented to the user as an alternate log on option, rather than a procedure that replaces the traditional log on procedure the user normally uses to log on to a virtual machine.

Figure 4:
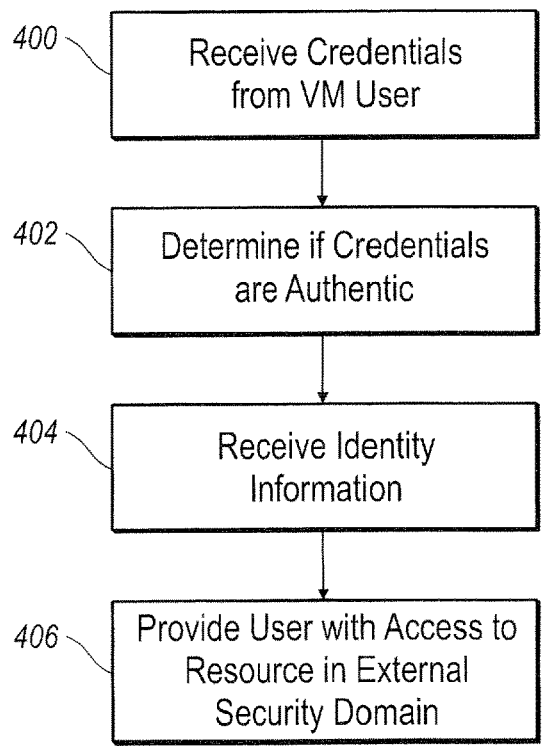
FIG. 4 illustrates an example process for providing a virtual machine user access to a resource in an external security domain, in accordance with various embodiments.

FIG. 4 illustrates an example process for logging onto a virtual machine using a custom credential provider in accordance with various embodiments. Although this figure, as well as any other process illustrations contained in this disclosure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments.

FIG. 4 is an example process for providing the user of a virtual machine with access to a resource or application outside of the user's existing security domain by use of a credential provider, in accordance with various embodiments. In operation 400, the credential provider receives credentials from a virtual machine user. As discussed above, credentials are the user's existing credentials obtained from an identity provider and can be in various forms including but not limited to text, smart card data, biometrics or other forms of user security credentials. In operation 402, the credential provider forwards the user's credentials to an authentication entity. The authentication entity is a server configured for ADFS and used to authenticate the user's credentials.

In operation 404, the credential provider receives a security token from the authentication entity, if the authentication entity has authenticated the user's credentials. If the user's credentials have not been authenticated, the authentication entity indicates to the credential provider that the user of the virtual machine has been denied access to the desired application. The security token contains information about the virtual machine user which can be used to identify the user's privileges in the external security domain. In operation 406, the user is provided access to the desired resource in an external security domain. Thus, the process illustrated in FIG. 4 allows the user of a virtual machine to obtain access to a resource outside of the user's existing security domain by use of a credential provider that receives the user's existing credentials, forwards the credentials to an authentication entity, and receives a security token that provides the user with access and permissions to the desired resource.

Figure 5:
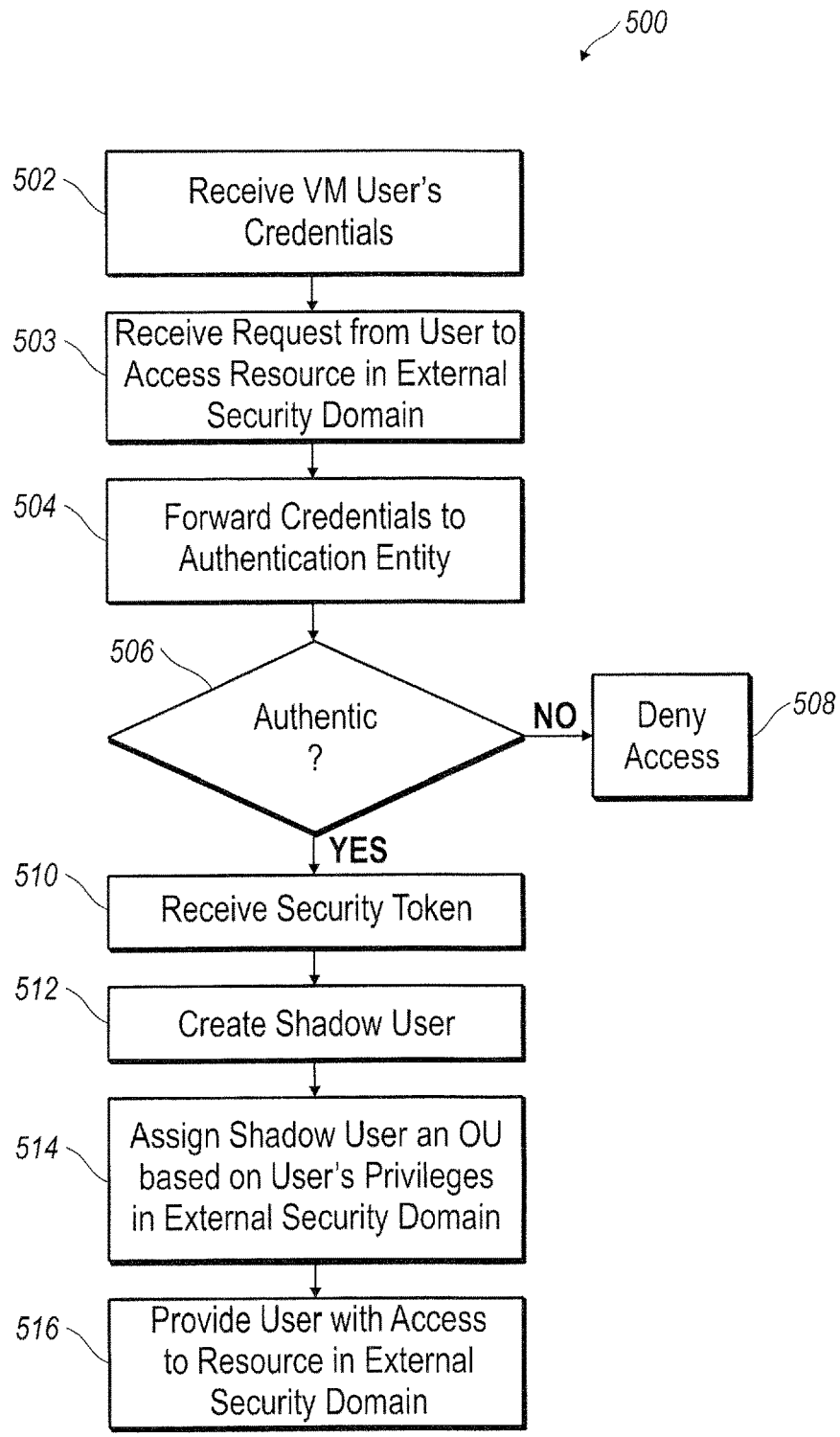
FIG. 5 illustrates an example process for assigning privileges to a virtual machine user via the use of a security token, in accordance with various embodiments.

FIG. 5 illustrates an exemplary process 500 that can be used by a credential provider to provide end-user federated access to virtual machines. In operation 502, a user logs onto a virtual machine using their existing AD credentials via the use of the credential provider. In operation 503, the user attempts to access a resource that resides outside of the user's original security domain. In operation 504, the credential provider forwards the credentials to an authentication entity. In one embodiment, shown in FIG. 2, the user's credentials are forwarded to an authentication entity that forwards the request on to the customer's SAML/ADFS security token service. In operation 506, the authentication entity determines whether the user's credentials are authentic. If the user credentials cannot be verified, the user is denied access to federated logon at the virtual machine, via operation 508. If the user's credentials are authentic, the SAML/ADFS security token generates a security token which is forwarded to the authentication service and to the credential provider, at operation 510. The security contains information which can be used to specify privileges for the user. In one embodiment, the credential provider creates a shadow user having the same logon identification as the user, at operation 512. The shadow user is created in the external security domain. The user is assigned an OU based on the user's privileges in the external domain, at operation 514. The user can now log on to the virtual machine and access the resource or application in the external security domain with designated privileges, at operation 516. The method described herein thereby provides end-users with an alternative log on procedure in order to have federated access to applications on virtual machines. For users that desire to access applications within their home security domain, the original security token provided by the user's identity provider is used to authenticate the user and authorize access.

Figure 6:
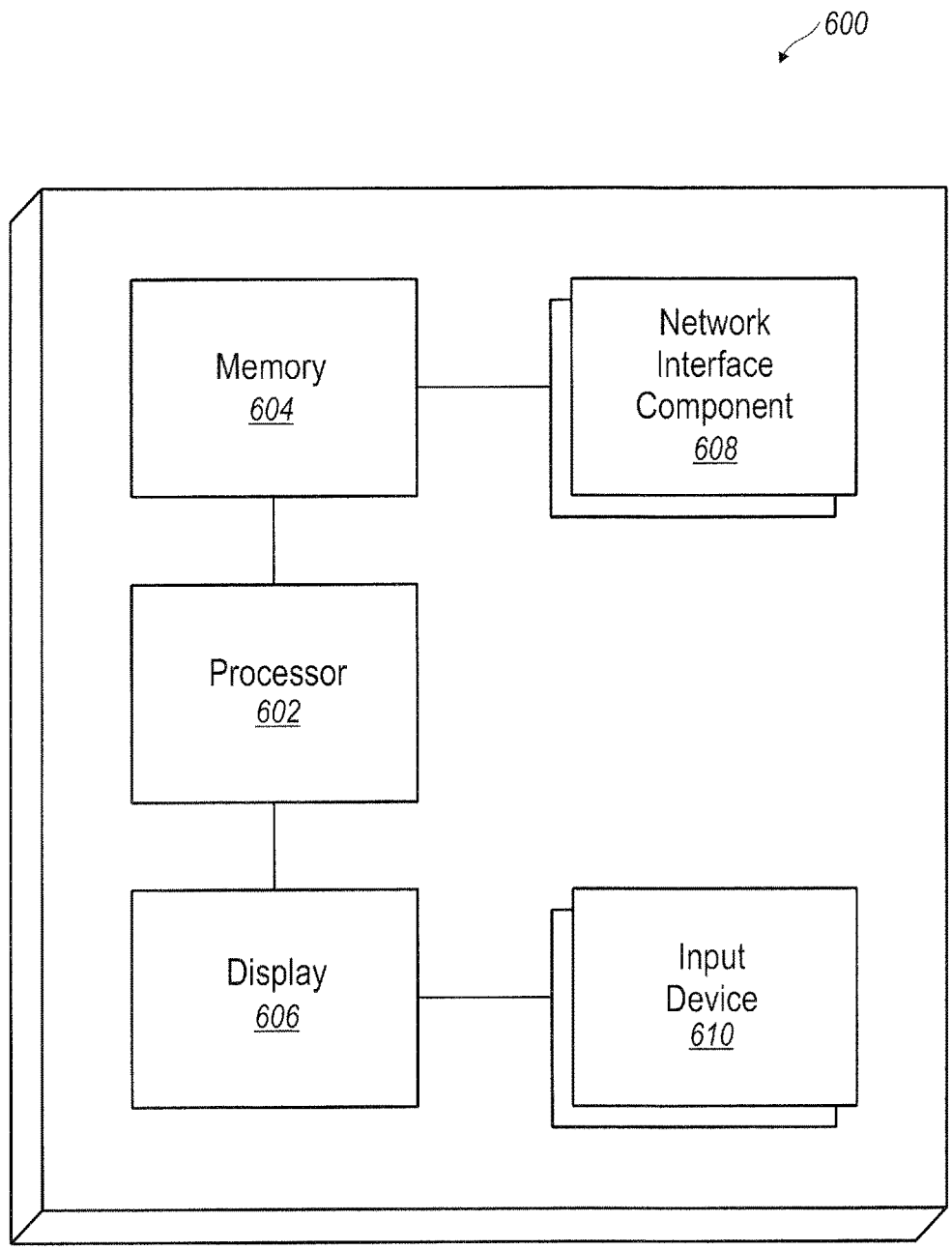
FIG. 6 illustrates a logical arrangement of a set of general components of an example computing device, in accordance with various embodiments.

FIG. 6 illustrates a logical arrangement of a set of general components of an example computing device 600 used in accordance with the various embodiments described herein. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. The device can include one or more network interface components 608 configured to enable the device to transmit and receive information over a network. As discussed, the device in many embodiments will include at least one input element 610 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more network interface elements 608 for communicating over various networks, such as a Wi-Fi, Bluetooth, RF, wired, or wireless communication systems. The device in many embodiments can communicate with a network, such as the Internet, and may be able to communicate with other such devices.

Figure 7:
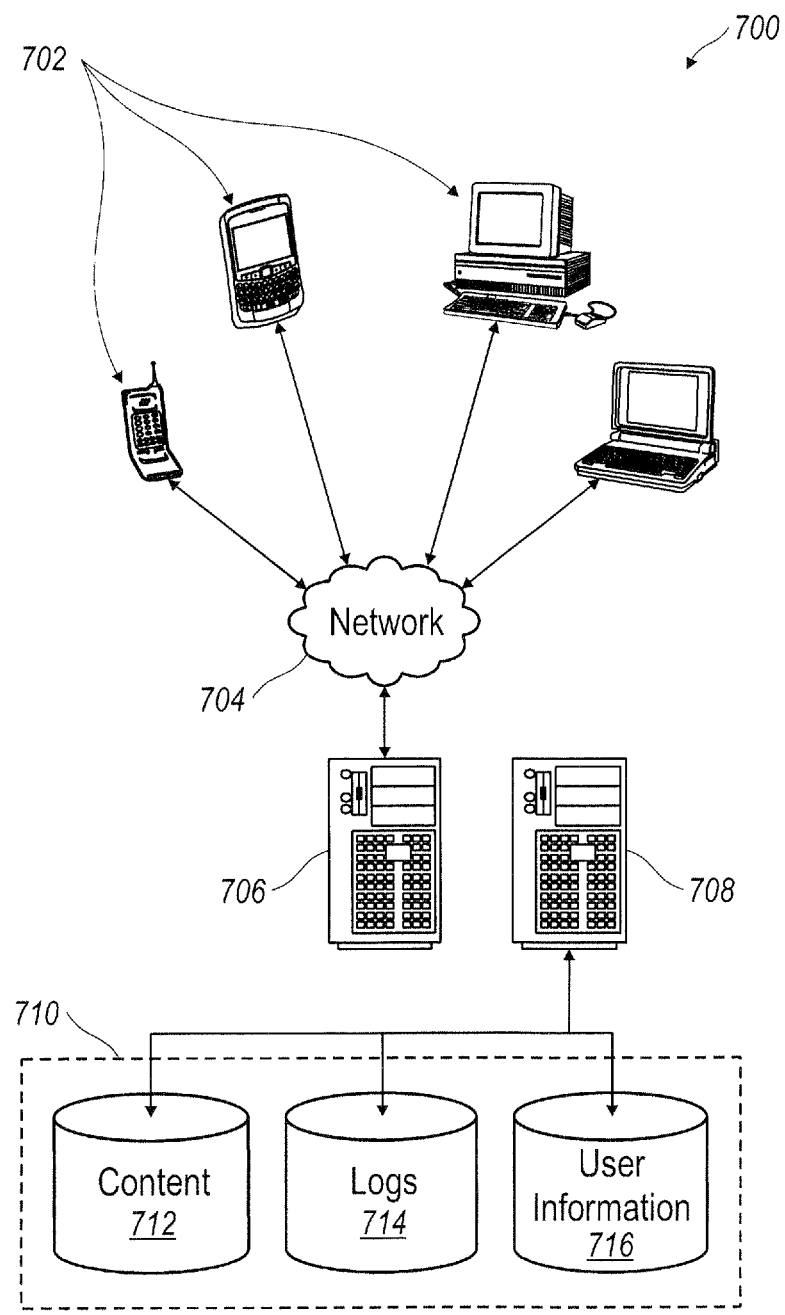
FIG. 7 illustrates an example of an environment for implementing aspects in accordance with various embodiments.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server 706. It should be understood that the Web and application servers 20 are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java, C, C# or C++, or any scripting language, such as Perl, Python, or TCL, as well as combinations thereof. The server(s) may also include database servers, including without limitation those commercially available from Oracle*, Microsoft*, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary tiles for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method comprising:
   prompting, at a credential provider application that resides on a virtual machine, a user of the virtual machine to provide one or more user credentials via a log on interface on the virtual machine, the virtual machine and the credential provider application that resides on a virtual machine being in an external security domain outside of an original security domain of the user, the one or more user credentials provided by the original security domain of the user;
   receiving, at the credential provider, the one or more user credentials from the user of the virtual machine, wherein:
      the one or more user credentials are obtained by the user from the original security domain of the user, the original security domain comprising a plurality of host machines, the user credentials providing access to a first resource hosted in the original security domain of the user;
      the virtual machine and the credential provider application that resides on the virtual machine are in the external security domain outside the original security domain of the user;
   receiving, from the user, a request to access, via the virtual machine, a second resource in the external security domain of the user;
   forwarding the one or more user credentials to an authentication entity in the external security domain; and
   based at least in part on a determination that the one or more credentials are authentic:
      receiving from an identity provider of the original security domain of the user a first security token for providing access to the second resource in the external security domain via the virtual machine;
      creating a shadow user within the external security domain based on the user credentials;
      assigning privileges to the shadow user based on information in the first security token wherein the information in the first security token corresponds to a set of allowed actions the shadow user may take with respect to the second resource and a set of forbidden actions the shadow user may not take with respect to the second resource while logged onto the virtual machine; and
      providing the user of the virtual machine with access to the second resource in the external security domain via the virtual machine as determined using the privileges assigned to the shadow user.

2. The computer-implemented method of claim 1, further comprising granting the user access to the second resource within the external security domain using a second security token associated with the shadow user.

3. The computer-implemented method of claim 1, wherein the one or more user credentials are in the form of at least one of biometrics, smart card data, or text entries.

4. A computer-implemented method comprising:
prompting, at a credential provider application that resides on a virtual machine, a user of the virtual machine to provide one or more user credentials via a log on interface on the virtual machine, the virtual machine and the credential provider application that resides on the virtual machine being in an external security domain outside of an original security domain of the user, the one or more user credentials provided by the original security domain of the user;
receiving, at the credential provider of the virtual machine, the one or more credentials from the user of the virtual machine, wherein:
the one or more credentials provide access to a first resource in the original security domain of the user, the original security domain comprising a plurality of host machines; and
the virtual machine and the credential provider reside in the external security domain outside the original security domain of the user;
determining, by the credential provider application that resides on the virtual machine, if the one or more credentials are authentic; and
based at least in part on a determination that the credentials are authentic:
receiving identity information for the user, the identity information generated by an identity provider of the original security domain of the user and including a security token issued by the identity provider wherein the information in the security token indicates a set of allowed actions the shadow user may take with respect to a second resource and a set of forbidden actions the shadow user may not take with respect to the second resource while logged onto the virtual machine;
creating a shadow user within the external security domain based on the security token;
assigning privileges to the shadow user based on the security token; and
providing the user of the virtual machine with access to the second resource via the virtual machine based on the privileges assigned to the shadow user, the second resource residing in the external security domain, wherein the virtual machine is accessed by using the identity information.

5. The computer-implemented method of claim 4, further comprising retaining the privileges of the shadow user between user login attempts to the virtual machine.

6. The computer-implemented method of claim 5, wherein after each user login attempt, further comprising:
verifying the user is authenticated within the original security domain of the user; and
verifying the shadow user is authorized to access the privileges of the shadow user in the external security domain.

7. The computer-implemented method of claim 4, wherein the privileges further enable the user to access an application in the external security domain.

8. A computer system comprising:
a processor, and
a memory device including instructions that, as a result of being executed by the processor, cause the computer system to:
prompt, at a credential provider application that resides on a virtual machine, a user of the virtual machine to provide one or more user credentials via a log on interface on the virtual machine, the virtual machine and the credential provider application that resides on the virtual machine being in an external security domain outside of an original security domain of the user, the one or more user credentials provided by the original security domain of the user;
receive, at the credential provider application that resides on the virtual machine, the one or more credentials from the user of the virtual machine, wherein:
the virtual machine and the credential provider application that resides on the virtual machine are in the external security domain outside of the original security domain of the user; and
the one or more credentials provide access to a first resource in the original security domain of the user;
determine if the one or more credentials are authentic; and
based at least in part on a determination that the one or more credentials are authentic:
receive, in a security token, identity information for the user, the identity information generated by an identity provider in the original security domain of the user wherein the identity information indicates a set of allowed actions a shadow user may take with respect to a second resource and a set of forbidden actions the shadow user may not take with respect to the second resource;
based on the identity information, create the shadow user within the external security domain and assign privileges to the shadow user; and
based on the privileges assigned to the shadow user, provide the user of the virtual machine with access to the second resource in the external security domain via the virtual machine, wherein the virtual machine is accessed by using the identity information.

9. The computer system of claim 8, wherein the identity information includes a security token issued by the identity provider.

10. The computer system of claim 9, wherein information in the security token can be used to determine the privileges of the shadow user in the external security domain.

11. The computer system of claim 10, wherein the instructions further cause the computer system to retain the privileges of the shadow user between user login attempts to the virtual machine.

12. The computer system of claim 11, wherein after each user login attempt, further comprising:
verifying the user is authenticated within the security domain of the user; and
verifying the shadow user is authorized to access the privileges of the shadow user in the external security domain.

13. The computer system of claim 8, wherein the one or more credentials further enable the user to access, via the virtual machine, an application in the external security domain.

14. The computer system of claim 8, wherein the instructions further cause the computer system to send the one or more credentials to an Active Directory Federation Services (ADFS) entity in order to determine if the one or more credentials are authentic.

15. A computer-implemented method comprising:
prompting, at a credential provider application that resides on a virtual machine, a user of the virtual machine to provide one or more user credentials via a log on interface on the virtual machine, the virtual machine and the credential provider application that resides on the virtual machine being in an external security domain outside of an original security domain of the user, the one or more user credentials provided by the original security domain of the user;

receiving, at the credential provider application that resides on the virtual machine, the one or more user credentials from the user of the virtual machine;

receiving an indication that the user wishes to access, via the virtual machine, a resource in the external security domain;

forwarding the one or more user credentials to an authentication entity in the external security domain, the authentication entity determining if the user credentials are authentic; and based at least in part on a determination that the one or more credentials are authentic:
- receiving from an identity provider of the original security domain of the user a security token;
- based on the security token, creating the shadow user within the external security domain;
- assigning privileges to the shadow user based on information in the security token wherein the information in the first security token corresponds to a set of allowed actions the shadow user may take with respect to the resource and a set of forbidden actions the shadow user may not take with respect to the resource while logged onto the virtual machine; and
- providing the user with access to the resource via the virtual machine, the access based on the privileges assigned to the shadow user.

16. The computer-implemented method of claim 15, further comprising retaining the privileges between user login attempts to the virtual machine.

17. The computer-implemented method of claim 16, wherein after each user login attempt, further comprising:
- verifying the user is authenticated within the original security domain of the user; and
- verifying the user is authorized to access the privileges of the shadow user in the external security domain.

18. A non-transitory computer readable storage medium including instructions that, as a result of being executed by at least one processor of a computing system, cause the computing system to:
- prompt, at a credential provider application that resides on a virtual machine, a user of the virtual machine to provide one or more user credentials via a log on interface on the virtual machine, the virtual machine and the credential provider application that resides on the virtual machine being in an external security domain outside of an original security domain of the user, the one or more user credentials provided by the original security domain of the user;
- receive the one or more credentials from the user of the virtual machine, where:
  - the one or more credentials provide access to the original security domain of the user and are received through the credential provider application that resides on the virtual machine; and
  - the virtual machine and the credential provider application that resides on the virtual machine are in the external security domain outside of the original security domain of the user;
- determine if the one or more credentials are authentic; and
- based at least in part on a determination that the one or more credentials are authentic:
  - receive, in a security token, identity information for the user, the identity information generated by an identity provider of the original security domain of the user, wherein the identity information designates privileges including an allowed action a shadow user may take with respect to a resource and a forbidden action the shadow user may not take with respect to the resource;
  - create the shadow user having the privileges to the resource designated in the identity information; and
  - provide the user of the virtual machine with access to the resource while logged onto the virtual machine, the resource residing in the external security domain, wherein the virtual machine is accessed by using the privileges of the shadow user to access the resource.

19. The non-transitory computer readable storage medium of claim 18, wherein the identity information includes the security token issued by the identity provider.

20. The non-transitory computer readable storage medium of claim 19, wherein information in the security token can be used to determine the privileges of the shadow user.

21. The non-transitory computer readable storage medium of claim 20, wherein the instructions further cause the computer system to retain the privileges between user login attempts to the virtual machine.

22. The non-transitory computer readable storage medium of claim 21, wherein after each user login attempt, further comprising:
- verifying the user is authenticated within the original security domain of the user; and
- verifying the user is authorized to access the privileges of the shadow user.

* * * * *